United States Patent [19]

Ikoma et al.

[11] Patent Number: 4,491,929
[45] Date of Patent: Jan. 1, 1985

[54] APPARATUS FOR DISCRIMINATION OF SHEET TRANSFER CONDITION

[75] Inventors: Tadashi Ikoma; Syozo Miyawaki, both of Tokyo, Japan

[73] Assignee: Ricoh Company, Ltd., Tokyo, Japan

[21] Appl. No.: 335,415

[22] Filed: Dec. 29, 1981

[30] Foreign Application Priority Data

Jan. 8, 1981 [JP] Japan ............................ 56-1416

[51] Int. Cl.³ .................... B65H 7/12; G03G 15/00
[52] U.S. Cl. .................................. 364/563; 364/507; 271/263; 226/177; 355/145 H
[58] Field of Search .............. 364/472, 560, 563, 469, 364/479, 523, 507, 552; 355/3 SH, 14 C, 3 BE, 14 SH, 14 R, 97, 133; 377/8, 24; 271/263; 226/177

[56] References Cited

U.S. PATENT DOCUMENTS

| | | | |
|---|---|---|---|
| 3,566,092 | 2/1973 | Grant et al. | 364/469 |
| 4,156,133 | 5/1979 | Legg | 355/14 C |
| 4,378,109 | 3/1983 | Takahashi et al. | 271/263 |
| 4,393,375 | 7/1983 | Sugiura et al. | 355/14 R |
| 4,398,711 | 8/1983 | Horst et al. | 271/263 |

Primary Examiner—Raulfe B. Zache
Assistant Examiner—Dale M. Shaw
Attorney, Agent, or Firm—David G. Alexander

[57] ABSTRACT

An apparatus for discriminating a sheet transfer condition has two opposite rollers at least one of which has an axis of rotation which is movable toward and away from that of the other roller. The thickness of a sheet nipped between the two rollers is detected while the rollers are rotated, through a displacement of the movable roller. The thickness is computed utilizing a value provided by integrating, averaging, smoothing or otherwise processing on a time series basis the displacement which occurs during a time period for which at least one of the rollers completes an integral number of rotations.

The thickness is computed by subtracting a so processed value for a case wherein a sheet is absent between the rollers from a so processed value for a case wherein a sheet is present between the rollers.

Where the rollers have a common diameter, the time period which they take to complete an integral number of rotations is employed as the aforesaid time period for an integral number of rotations. Where the diameters of the rollers differ from each other, the time period for a larger diameter roller to complete an integral number of rotations or the time period for both the rollers to complete their integral numbers of rotations is selected as the same time period concerned.

11 Claims, 18 Drawing Figures

ROLLER 54 ECCENTRICITY

Fig. 4b

ROLLER 56 ECCENTRICITY

APPARATUS FOR DISCRIMINATION OF SHEET TRANSFER CONDITION

BACKGROUND OF THE INVENTION

The present invention relates to an apparatus for discriminating a sheet transfer condition and, more particularly, to such an apparatus which detects failures in the transfer of sheets accurately and positively while the sheets are transferred by a pair of coactive rollers.

In a facsimile apparatus, copying machine or printer, for example, sheets such as original documents or recording sheets are pulled out one by one from a cassette or a tray and conveyed by a pair of registration rollers to a processing station which is a scanning station or a recording station. When two or more sheets are fed stacked together or when the thickness of a sheet is larger than a predetermined thickness, various troubles such as a sheet jam, sheet breakage or damage to the mechanism will be invited.

An implement heretofore known for avoiding such troubles comprises an additional pair of rollers located in a predetermined sheet feed path or utilizes the registration roller pair. With this known implement, a change in the gap between the rollers which is larger than a predetermined amount indicates the feed of two or more sheets stacked together. Sheet thickness is measured by a light source and a light receiving element which are located to face each other on the opposite sides of the sheet transfer path, so that an amount of light transmitted through a sheet represents a sheet thickness.

However, the rollers used for detecting the simultaneous feed of two or more sheets must have their outer peripheries treated with disproportionate accuracy to have predetermined diameters and be free from undulation. Also, the axis of rotations of the rollers need be held in a constant and stable relationship without any dislocation relative to each other, while the axis of rotation of one roller has to retract accurately from that of the other roller by an amount equal to a roller gap produced by a sheet which is being driven by the rollers. Admitting that all such requirements are fulfilled, accurate measurement of the roller gap or sheet thickness tends to fail after a long time of use of the rollers. Meanwhile, the light receiving element coactive with the light source cannot operate accurately or stably because deposition of dust or particles produced from sheets would affect the amount of light incident on the light receiving element. To overcome this problem, use must be made of a light source which has a relatively large output at the sacrifice of the economy.

SUMMARY OF THE INVENTION

In accordance with the present invention, an apparatus for the discrimination of a sheet transfer condition has two opposite rollers at least one of which has an axis of rotation which is movable toward and away from that of the other roller. The thickness of a sheet or sheets nipped between the two rollers is detected while the rollers are rotated, through a displacement of the movable roller. The thickness is computed utilizing a value provided by integrating, averaging, smoothing or otherwise processing on a time series basis the displacement which occurs during a time period for which at least one of the rollers completes an integral number of rotation.

The thickness is computed by subtracting a so processed value for a case wherein a sheet is absent between the rollers from a so processed value for a case wherein a sheet is present between the rollers.

Where the rollers have common diameter, the time period which they take to complete an integral number of rotation is employed as the aforesaid time period for an integral number of rotation. Where the diameters of the rollers differ from each other, the time period for a larger diameter roller to complete an integral number of rotation or the time period for both the rollers to complete their integral numbers of rotation is selected as the same time period concerned.

It is accordingly an object of the present invention to provide an apparatus for the discrimination of a sheet transfer condition which can detect positively and accurately the thickness of a sheet or sheets while the sheet is driven by a pair of rollers.

It is another object of the present invention to provide an apparatus for the discrimination of a sheet transfer condition which can detect the feed of two or more sheets stacked together through a pair of rollers.

It is another object of the present invention to provide a generally improved apparatus for the discrimination of a sheet transfer condition.

Other objects, together with the foregoing, are attained in the embodiments described in the following description and illustrated in the accompanying drawings.

BRIEF DESCRIPTION OF THE DRAWINGS

FIG. 3b is a plan view of the sensor arrangement shown in FIG. 3a;

FIG. 5b is a fragmentary plan view of the sensor arrangement of FIG. 5a;

FIG. 9b is a graph representing a voltage charged in a capacitor of the integration circuit of FIG. 9a.

DESCRIPTION OF THE PREFERRED EMBODIMENTS

While the apparatus for the discrimination of a sheet transfer condition of the present invention is susceptible of numerous physical embodiments, depending upon the environment and requirements of use, substantial numbers of the herein shown and described embodiments have been made, tested and used, and all have performed in an eminently satisfactory manner.

Figure 1:
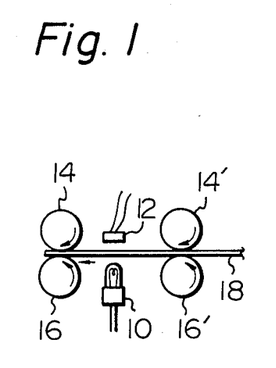
FIGS. 1, 2 and 3a are side elevations of different sensor arrangements which have heretofore been used for detecting a simultaneous feed of two or more sheets as well as for measuring the thickness of a sheet, respectively.

Referring to FIG. 1 of the drawings, a prior art apparatus for discriminating a sheet feed condition comprises a light emitting element or light source 10 and a light receiving element 12 which are located to face each other on the opposite sides of a predetermined sheet transfer path. A sheet 18 is transferred along the sheet transfer path in a direction indicated by an arrow by two pairs of rollers 14, 16 and 14', 16' each being rotated in a direction also indicated by arrows. Light emitted from the light source 10 is transmitted through the sheet 18 to become incident on the light receiving element 12. The thickness of the sheet 18 is represented by an amount of the light received by the element 12.

Figure 2:
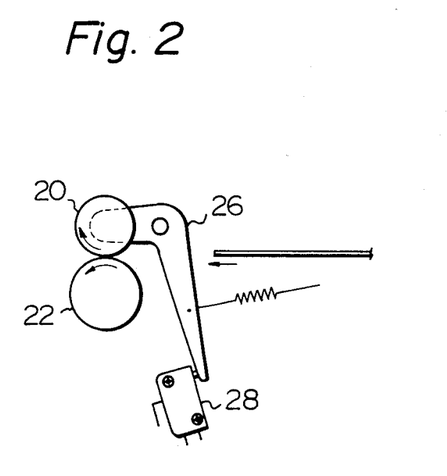

Another prior art apparatus is illustrated in FIG. 2. This apparatus includes a roller 22 and a roller 20 which is movable relative to the roller 22. The displacement of the roller 20 relative to the roller 22 in the roller gap direction is detected through a spring biased angled lever arm 26 which is pivotable and adapted to amplify such a displacement of the roller 20. Upon an increase in the displacement beyond a predetermined amount, the angled lever arm 26 will be moved to actuate a microswitch 28.

Figure 3A:
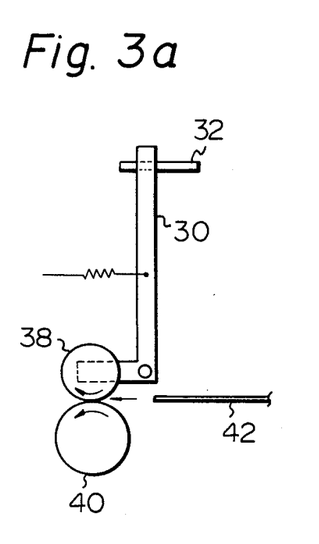
Figure 3B:
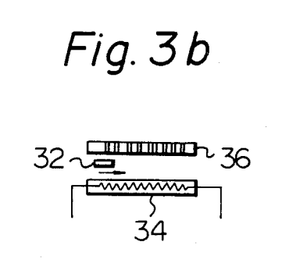
Figure 4A:
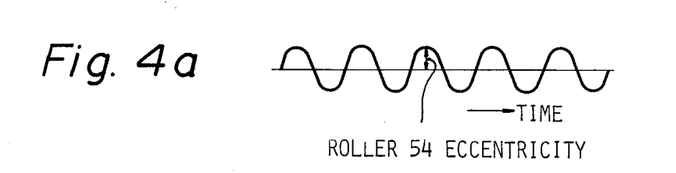
FIGS. 4a and 4b show the displacements of the surfaces and, therefore, the axis of rotations of a pair of rollers with respect to time, which are attributable to uneven diameters and unsmooth surfaces of the respective rollers.
Figure 4B:
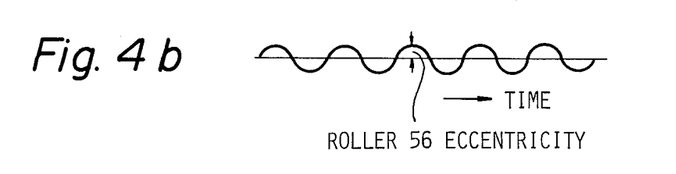

Still another prior art apparatus is shown in FIGS. 3a and 3b. This apparatus comprises a spring biased angled lever arm 30 which is pivotally mounted and carries a light intercepting plate 32 at its one end and a roller 38 at its other end. The roller 38 faces and is movable relative to a coactive roller 40. As seen in FIG. 3b, a light emitting element or light source 34 and a light receiving element 36 are located in alignment on the opposite sides of the light interceptor 32. Thus, when the lever arm 30 is angularly moved in accordance with a thickness of a sheet 42 which is being transferred by the rollers 38 and 40, its light interceptor 32 will advance into the gap between the light source 34 and the light receiving element 36. The resultant fluctuation in the amount of light incident on the light receiving element 36 indicates a thickness of the sheet 42.

All the prior art apparatuses discussed hereinabove are disadvantageous in various aspects. In the apparatus of FIG. 1, fine particles of dust, particularly those produced from sheets, will be critical for the accurate detection of light amount by the light receiving element 12, while a sufficiently large amount of light must be transmitted through the sheet. The apparatus of FIG. 2 cannot detect the stacked feed of sheets but for those sheets each having a predetermined thickness, while it requires considerable accuracy in the location of the microswitch 28. In the apparatus of FIG. 2 or that of FIGS. 3a and 3b, the feed roller 22, 40 having a fixed axis of rotation and the roller 20, 38 having an axis of rotation retractable from that of the feed roller involve eccentricities individually. Since the roller 20, 38 moves up and down even when no sheet is under transfer along the sheet feed path, its eccentricity has to be maintained very small relative to the sheet thickness. Should the eccentricity be as large as the sheet thickness, the apparatus would fail to perform accurate detection of the feed of stacked sheets.

The present invention is similar to the conventional techniques shown in FIGS. 2 and 3a in employing a displacement of a roller for the detection of a sheet thickness, but differs therefrom in that it can positively detect a sheet thickness substantially regardless of the eccentricities of the rollers or the stacked feed of sheets.

A characteristic feature of the present invention resides in that the thickness of a sheet or sheets under transfer is computed by integrating, averaging smoothing or otherwise processing on a time series basis the displacement which occurs during a time period for which at least one of the opposite rollers completes an integral number of rotation.

Reference will now be made to FIGS. 4a-10 for describing preferred embodiments of the present invention in detail.

Figure 5A:
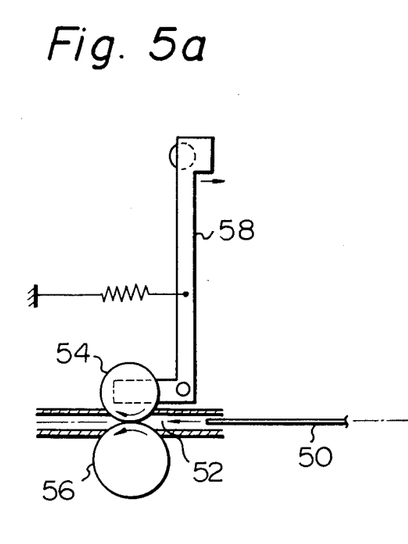
FIG. 5a is a side elevation of a sheet thickness sensing arrangement of a sheet feed condition discriminating apparatus embodying the present invention.
Figure 5B:
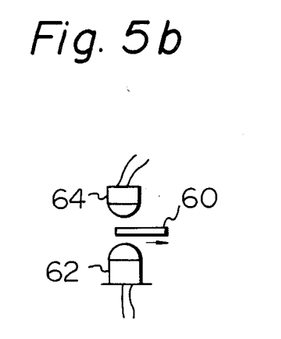

Referring to FIGS. 5a and 5b, a spring biased angled and pivotable lever arm 58 carries a roller 54 at its one end and has a light intercepting portion 60 at its other end (FIG. 5b). The roller 54 coacts with a roller 56 having a fixed axis of rotation. These rollers 54 and 56 protrude into a predetermined sheet transfer path 52 to advance a sheet 50 as indicated by an arrow. The lever arm 58 and, therefore, the roller 54 are moved in accordance with a thickness of the sheet 50 under conveyance, causing the light interceptor 60 on the lever arm 58 to move into the gap between a light source 62 and a light receiving element 64.

Suppose that the rollers 56 and 54 are common in diameter and their outer peripheries describe true circles. Then, where the rollers 54 and 56 are spaced from each other, they will undergo displacements shown in FIGS. 4a and 4b, respectively, at their opposing points. The displacement of the roller 54 will fluctuate according to the composite waveform of the waveforms of FIGS. 4a and 4b when it remains in engagement with the roller 56. However, the period of the fluctuation is kept constant since it is the time period which the roller 54 takes to complete one full rotation. If one or both of the rollers 54 and 56 are not of a true circle, waveforms will appear which rise and fall more frequently or densely than the waveforms shown in FIGS. 4a and 4b but, again, the period of the fluctuation is the time period for each roller to complete one rotation. It follows that, when the displacement during a time period for which one of the rollers completes one, two, three or like integral number of rotations is integrated, averaged, smoothed or otherwise processed on a time series basis, the resultant value remains constant regardless of eccentricities of the rollers, wherever the measurement may be started. The value computed in the absence of a sheet between the rollers corresponds to zero sheet thickness. Thus, the thickness of a sheet can be obtained by subtracting a computed value in the absence of the sheet from a computed value in the presence of the sheet.

Where the rollers have diameters which differ from each other, displacements occurred during a time period for both of the rollers to reach integral numbers of rotations and processed on the time series basis will provide a value which is not affected by the eccentricities. Therefore, the time width for the time series processing should preferably be the time period for the opposite rollers to reach integral numbers of rotations. However, said time width may be the time period for the integral number of rotations of one of the rollers having a larger diameter, partly because the eccentricity of a larger diameter roller is generally greater than that of a smaller diameter roller and partly because, due to a large number of rotations of the smaller diameter roller which occur before the larger diameter roller completes an integral number of rotations, the eccentricity for the fraction of the integral number of rotations of the smaller diameter roller during said time period little contributes to the value provided by the time series processing. Experiments showed that, when the larger diameter roller is 1.5 times or more as large as the smaller diameter roller, a stacked feed of sheets in a copying machine can be detected in a time period for an integral number of rotations of the larger diameter roller without being affected by the eccentricity.

Figure 6:
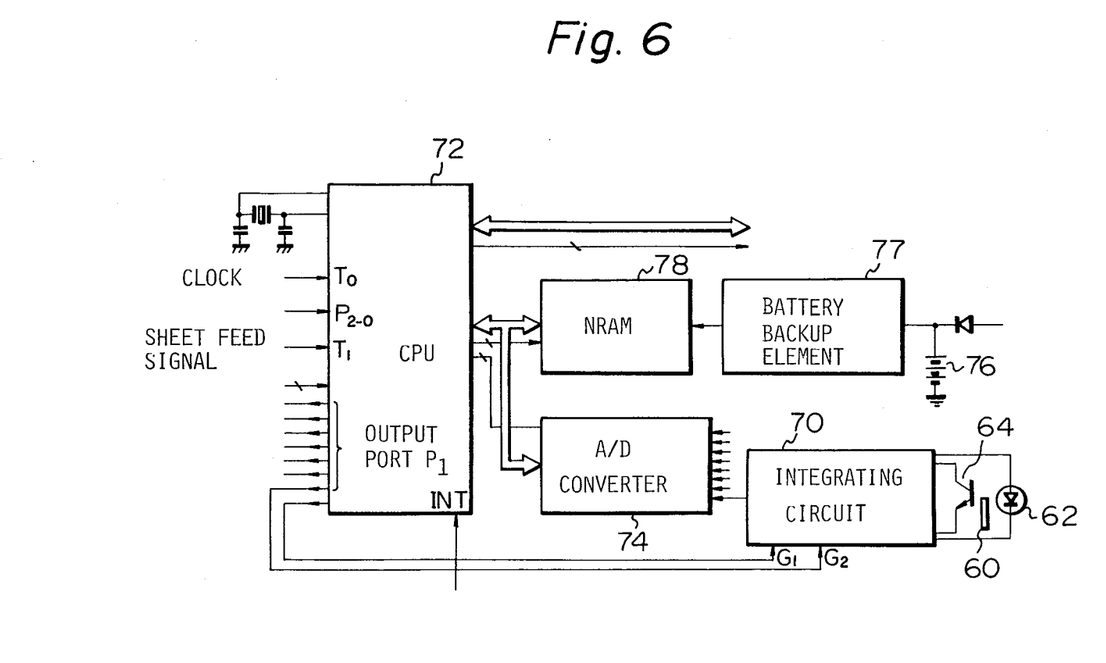
FIG. 6 is a block diagram showing the entire construction of the apparatus of FIGS. 5a and 5b.

Referring to FIG. 6, a computing circuit is shown which is designed to compute an output of the light receiving element 64 of the embodiment shown in FIGS. 5a and 5b. The light emitting element comprises a phototransistor 64 which is connected with an integration circuit 70 to have its output signal indicative of an amount of incident light integrated thereby. An integration time $t_1$ is controlled by a one chip microcomputer or central processing unit 72 in this embodiment. The integration time $t_1$ is preselected to be the minimum time at which the rollers 54 and 56 are to reach integral numbers of rotations individually. The output of the integrator 70 is coupled to one of multiple channels of an analog-to-digital converter 74. After the time period $t_1$ for integration expires, the central processing unit 72 designates the output of the analog-to-digital converter 74 to an analog-to-digital conversion digital code of a channel CH7 input, and thus reads it in. The central processing unit 72 has an input port $T_1$ which is supplied with a sheet feed signal from a sheet feed system. The sheet feed signal is high or logical "1" level while a sheet is present between the rollers 54 and 56. Based on this signal, the central processing unit 72 measures a thickness of the sheet, computes and discriminates the transient situation. The data from the central processing unit 72 is loaded in a non-volatile semiconductive random access memory or NRAM 78 which is backed up by a secondary battery 76 through a battery backup element 77. When determined the situation as a failure, the central processing unit 72 produces and latches at its output port $P_1$ a signal indicative of such a failing situation.

Figure 7:
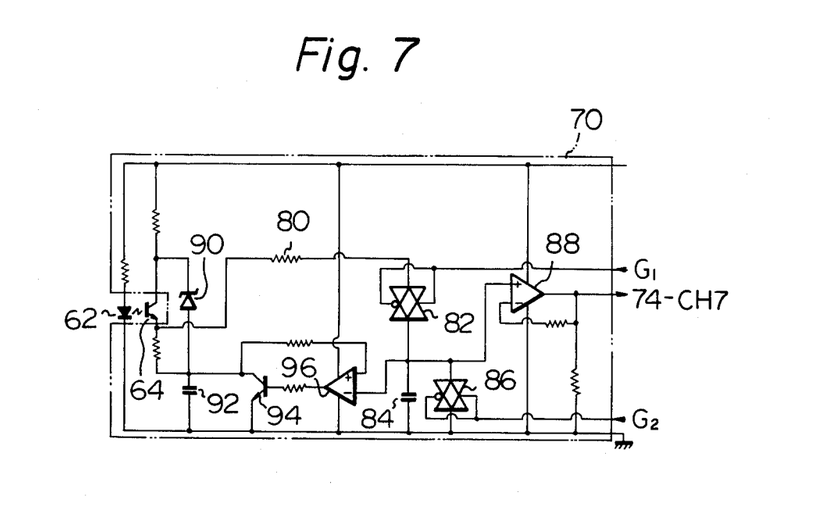
FIG. 7 is a diagram showing an integration circuit included in the construction of FIG. 6.

Details of the integration circuit 70 are shown in FIG. 7. An integrating capacitor 84 is connected with the emitter of the phototransistor 64 via a CMOS switching element 82 and a resistor 80 which is adapted to determine a charging time constant. While a gate signal $G_1$ is high or logical "1" level, the switching element 82 remains closed or turned on so that the emitter of the phototransistor 64 is kept in connection with the capacitor 84 via the resistor 80. A resetting CMOS switching element 86 is connected in parallel with the capacitor 84 such that it is closed or turned on to discharge the capacitor 84 when a second gate signal $G_2$ is high or logical "1" level. The output voltage of the capacitor 84 is amplified by an operational amplifier 88 and then coupled to the analog-to-digital converter 74. The output voltage of the capacitor 84 builds up according to a characteristic (linearity) which is dependent on the relative position and configuration between the elements 62 and 64 and the light interceptor 60 of the lever arm 58, photoelectric characteristic of the phototransistor 64 and settings of the various other circuit elements. Preferably, the buildup characteristic has a linear range which is as wide as possible. The integrator 70 of FIG. 7 therefore includes a linear compensation circuit made up of a Zener diode 90, a capacitor 92, a transistor 94 and an operational amplifier 96 between the phototransistor 64 and the capacitor 84.

The integrator 70 may be provided with any other circuit arrangement or may be replaced by an averaging circuit or a smoothing circuit, if desired. Moreover, the function of an integrating, averaging or smoothing circuit may be allotted to the central processing unit 72. The central processing unit 72 in such a case will be constructed to sample the digital data of the emitter potentials of the phototransistor 64 during the time period $t_1$ and at a predetermined period, and then total (integrate) or average the data.

Figure 8:
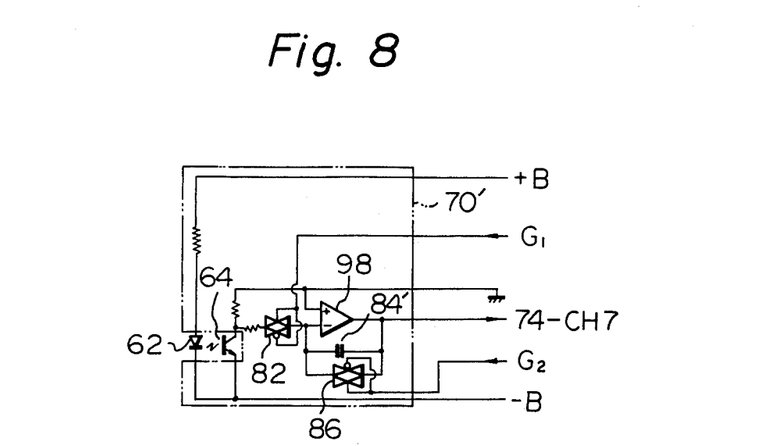
FIGS. 8 and 9a are diagrams showing first and second modifications to the integration circuit of FIG. 7, respectively.
Figure 9A:
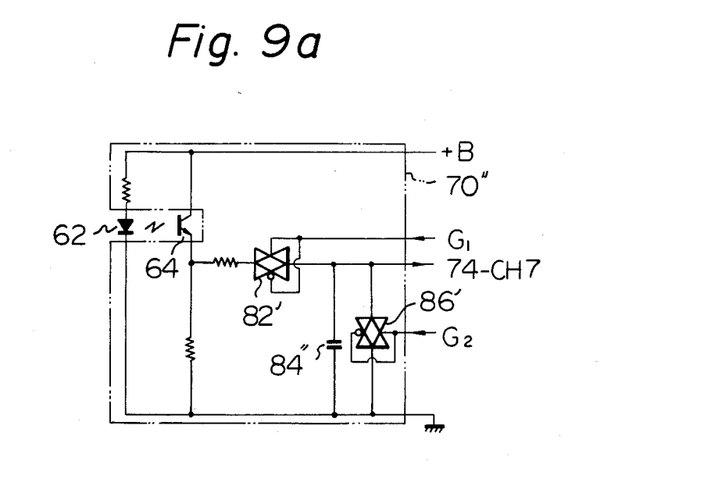
Figure 9B:
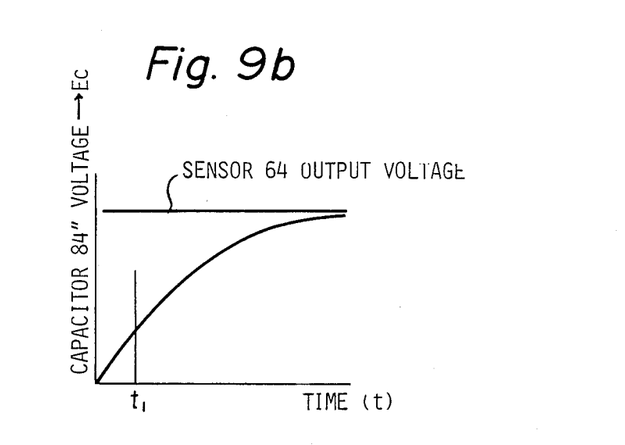

Referring to FIG. 8, an alternative form 70' of the integration circuit comprises an integrator constituted by a capacitor 84' and an operational amplifier 98. FIG. 9a illustrates still another alternative form 70'' of the integration circuit which consists of a simple resistor-capacitor charging network. While the output voltage of a capacitor 84'' shown in FIG. 9a has a rather poor linearity as shown in FIG. 9b, this can be overcome merely by setting the constant such that the time $t_1$ lies in a range having a good linearity. The linearity may also be improved by adequately designing the shape of a light mask on the element 64 or that of the light interceptor 60 on the level arm 58.

Figures 10, 10A:
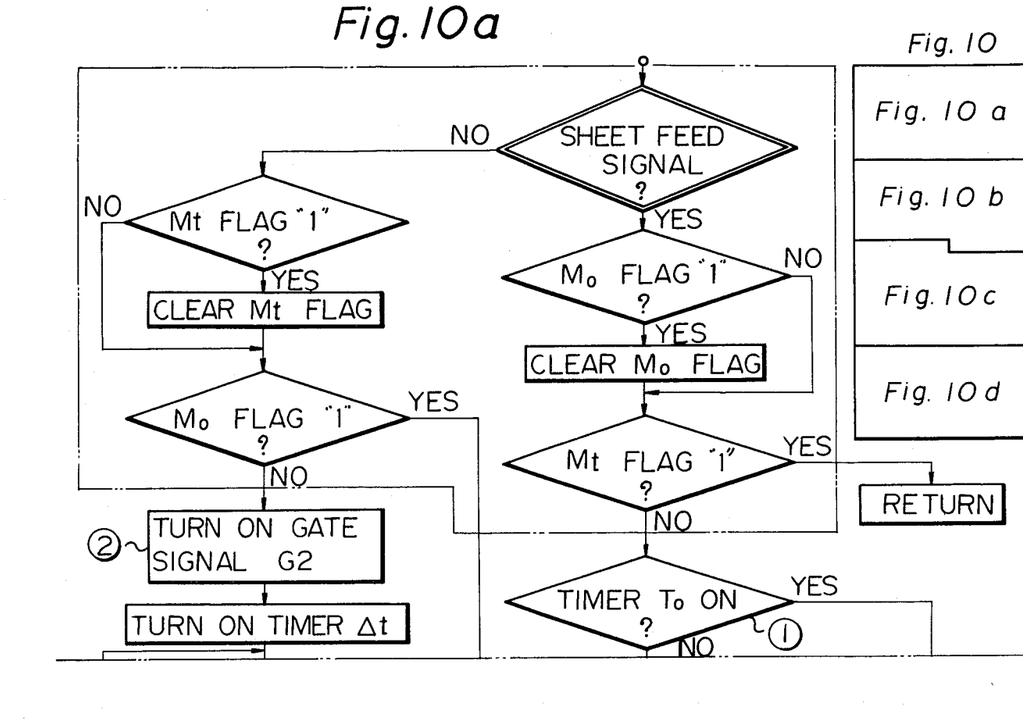
FIG. 10 is a flowchart showing an operation of a microcomputer or central processing unit included in the block diagram of FIG. 6.
Figure 10B:
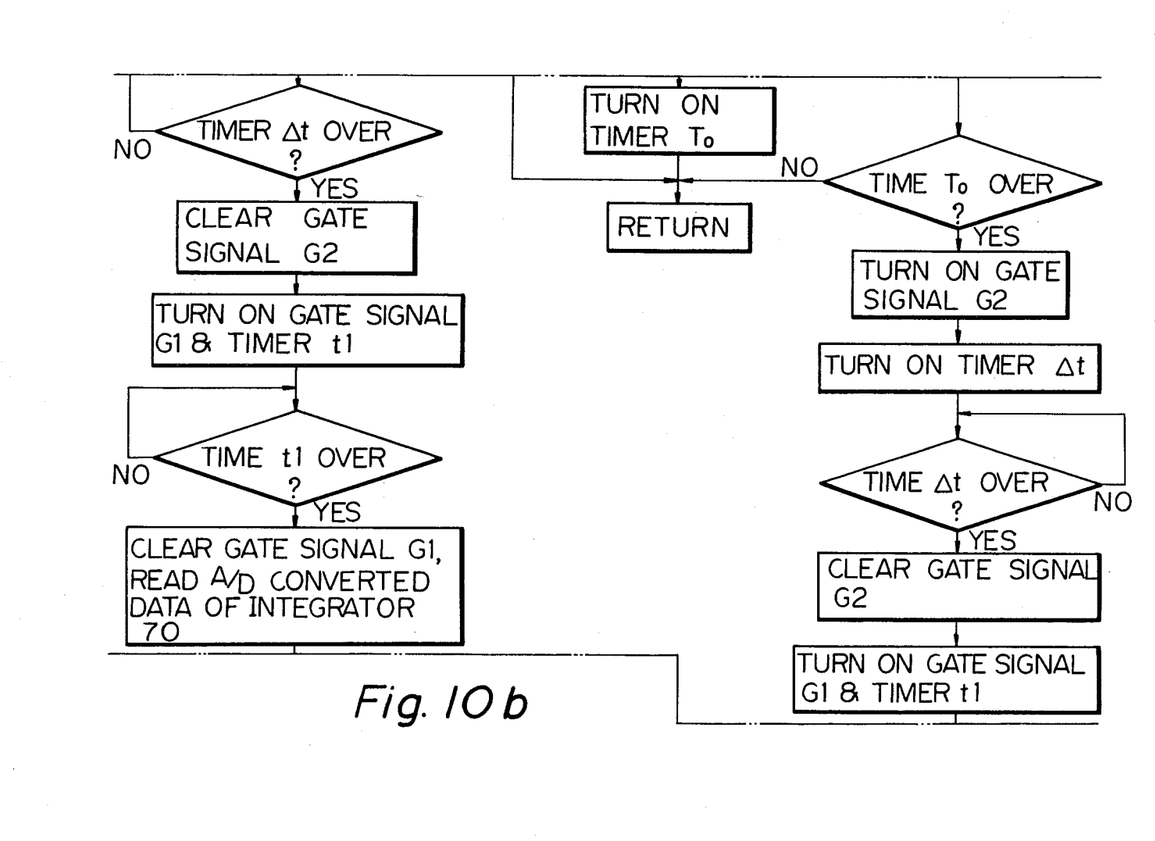
Figure 10C:
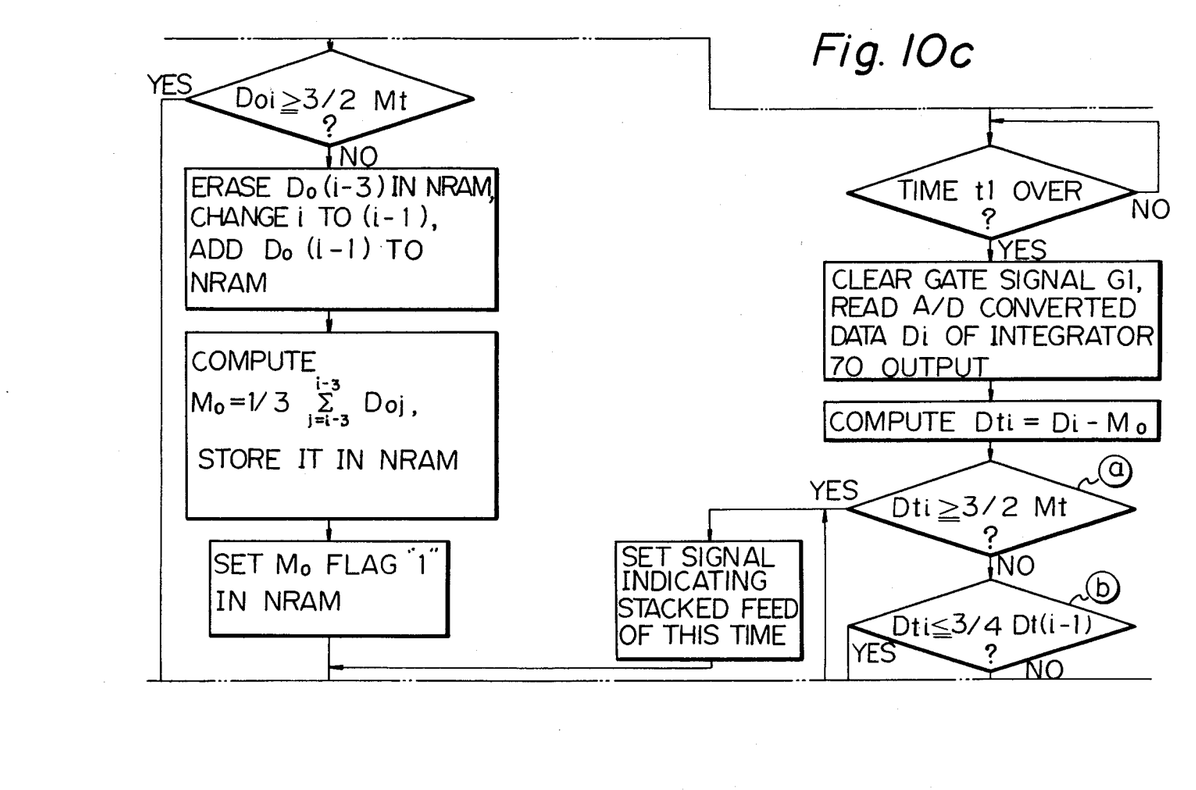
Figure 10D:
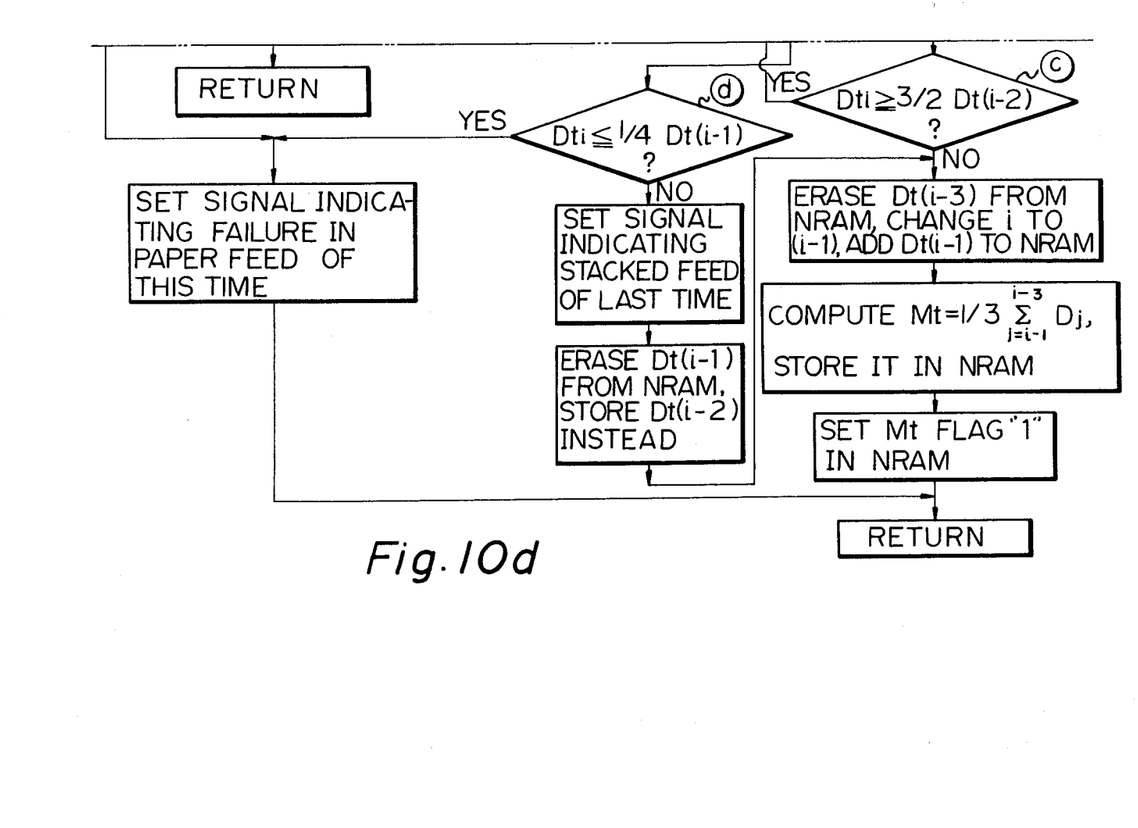

FIG. 10 is a flowchart demonstrating the measuring, computing and discriminating operations of the central processing unit 72. In FIG. 10, Mo flag represents a storage constituted by one region of the random access memory 78. This Mo flag is made logical "1" when the roll gap in the absence of a sheet between the rollers (zero sheet thickness) has been measured, the measured integrated data Doi stored in the random access memory 78, the average Mo=⅓ΣDoi of the data Doi and the data Do(i-1), Do(i-2) related with the preceding two times of measurement and previously stored in the memory 78 computed, and the average Mo fully stored in the memory 78. When thereafter the sheet feed signal becomes high or logical "1", the Mo flag is made logical "0". The high or "1" level of the Mo flag indicates that the high or "1" sheet feed signal has not arrived yet after the completion of the measurement of Doi and computation of Mo. Accordingly, the situation wherein the Mo flag is "1" and the sheet feed signal is "1" occurs at the leading edge of a "1" sheet feed signal (at the start of a sheet feed). Thereafter, the Mo flag falls to "0" while the sheet feed signal maintains the "1" level.

Mt flag in FIG. 10 represents a storage constituted by another region of the random access memory 78. This Mt flag is made logical "1" when the roll gap (sheet thickness) in the presence of a sheet between the rollers has been measured, a value (sheet thickness) Dti provided by subtracting the average Mo from the measured integrated data Di stored in the random access memory 78, and a failure discrimination completed. Thereafter, the Mt flag becomes logical "0" when the sheet feed signal is made logical "0" (indicating the absence of a sheet). The "1" level of the Mt flag implies that the "0" level sheet feed signal (sheet absent) has not arrived yet after processing the difference Dti. Thus, a situation wherein the Mt flag is "1" and the sheet feed signal is "0" occurs at the trailing edge of a "1" level sheet feed signal (at the end of a sheet feed). Afterwards, the Mt flag regains "0" level while the sheet feed signal maintains "0" level.

Timer To in FIG. 10 indicates an operation for counting a time period To with a program timer. The time period To is long enough for the temporary oscillation of the roller 54, which occurs when a sheet becomes nipped by the rollers, to settle down. The program timer starts counting the time period To at the leading edge of a "1" level sheet feed signal (from the instant a sheet has been nipped by the rollers). Timer $\Delta t$ indicates an operation for counting a time period $\Delta t$ with a program timer. This time period $\Delta t$ is long enough for the integrating capacitor 84 to be fully discharged. Further, timer $t_1$ indicates an operation for counting a time period $t_1$ with a program timer. The time period $t_1$ is an integration time (the minimum time period necessary for the rollers 54 and 56 reach integral numbers of rotations individually).

Also indicated by $G_1$, $G_2$ and Mt in FIG. 10 are gate signal for turning on the switching element 82, a gate signal for turning on the switching element 84 and an average $\frac{1}{3}\Sigma Dti$ of the measured thicknesses Dti, Dt(i-1) and Dt(i-2) of three successive sheets, respec- tively.

The central processing unit 72 checks the level of the sheet feed signal in a copy control main flow (a part of which is indicated by a dots-and-dash line in FIG. 10.) If the sheet feed signal is high or logical "1" level indicating a sheet feed, the Mo flag is checked. If this flag is logical "1" indicating that a sheet feed has been started, the Mo flag is cleared or made "0" and the Mt flag is checked. If the Mt flag is logical "0" showing that a thickness Dti measurement has not yet started or that said measurement is under way, the operation advances to a measurement and discrimination subflow which starts at a step ①. If the Mt flag is logical "0" indicating that a measurement and discrimination has been completed and the measured sheet is still present between the rollers 54 and 56, the operation returns to the main flow in FIG. 10 (RETURN). When the sheet feed signal is logical "0", the Mt flag is checked. If this flag is logical "1", indicating the end of a sheet feed, the Mt flag is cleared or made logical "0". Then, the Mo flag is checked, and, if it is logical "0" showing that a zero thickness (Doi) measurement has not been started, the operation jumps to a zero thickness measurement flow which starts at a step ②. If the Mo flag is logical "0" the operation returns to the main flow (RETURN) since a zero thickness measurement has been completed and no sheet is present between the rollers 54 and 56.

In the measurement and discrimination subflow which is the step ① and onward, whether or not the timer To has been turned on is determined. The on state of the timer To indicates that counting the time period To has started at the leading end of a logical "1" sheet feed signal; the off state of the same indicates that counting the time period To has not yet started though the sheet feed signal is logical "1" level. If the timer To has not been turned on, it is energized and the operation returns to the main flow. If the timer To has been turned on, whether the time period To has expired (TIMER OVER) is determined. If "yes", the gate signal $G_2$ is turned on to discharge the integrating capacitor 84. It will be seen that, when returned to the main flow, the operation again proceeds through the dots-and-dash line block of FIG. 10 to reach the step ① and thereat checks whether the time has been over.

When the gate signal $G_2$ is turned on, the timer $\Delta t$ is turned on. Because the operating time period $\Delta t$ of this timer is quite short, the operation is suspended until the time $\Delta t$ expires, without returning to the main flow. Upon the lapse of time $\Delta t$, the capacitor 84 is determined to have been fully discharged or reset and the gate signal $G_2$ is turned off. Then, the gate signal $G_1$ is turned on to trigger the timer $t_1$ thereby starting an integrating step. As the time $t_1$ expires, the gate signal $G_2$ is turned off to interrupt the integration and the data Di is read. Subsequently, the average Mo stored in the random access memory 78 (average of three times of zero gap measurement) is subtracted from the data Di to provide sheet thickness data Dti=Di−Mo. This completes a measurement of sheet thickness.

The data Dti thus obtained is compared with a value 3/2Mt which is the product of a coefficient 3/2 and an average $Mt=\frac{1}{3}\Sigma Dti$ of the past three successive times of measurement Dt(i-1), Dt(i-2) and Dt(i-3). If Dti≧3/2Mt, the thickness Dti is determined to represent a thickness of two or more sheets and, hence, a signal indicating a stacked feed of sheets is latched. If Dti≧3/2Mt, that one or less sheet has been fed is discriminated. Thereupon, the data Dti is compared with a value ¾Dt(i-1) stored in the random access memory 78 and which is the product of a coefficient ¾ and the result of the immediately preceding measurement Dt(i-1). If Dti≧¾Dt(i-1), the data Dti is determined to represent a zero sheet thickness which indicates no sheet feed and, therefore, a sheet feed failure in the path upstream of the rollers 54 and 56, or the data Dt(i-1), is determined to represent a stacked sheet feed (two sheets). Then, whether Dti≧¼Dt(i-1) is checked. If "yes", the data Dti is determined to be a zero sheet thickness; if "no", the data Dt(i-1) is determined to be a stacked feed thickness. In either case, a signal indicative of such a failure is produced. In the former case, the operation returns to the main flow while, in the latter case, the data Dt(i-1) stored in the random access memory 78 for computing an average Mt is replaced by the preceding data Dt(i-2). If Dti>¾Dt(i-1), all the conditions are determined normal and Dt(i-3) of the thickness data Dt(i-1), Dt(i-2) and Dt(i-3) in the random access memory 78 is erased and Dti is additionally written in the same memory to change "i" to "i-1". The stored data will also be altered in the same way when the immediately preceding sheet feed has been determined as a stacked feed. An average Mt of the three data is computed to be stored anew in the average storage of the random access memory 78. The Mt flag is made logical "1" and the operation returns to the main flow.

The coefficients 3/2, ¾ ¼ and the like are selected for the following purposes. Supposing that all the thickness data Dti stored in the random access memory 78 are a thickness d of one sheet, the average Mt is d and, therefore, Dti≧3/2Mt=1.5d at a step ⓐ. If the measured thickness Dti of this time is 1.5 times or more of the thickness d, the data Dti will be successfully determined to be the thickness of two or more stacked sheets. However, it may happen for one reason or another that the precedingly measured thickness Dt(i-1) stored in the random access memory 78 has been discriminated to be the thickness of one sheet despite that it is 2d or more. From the standpoint of probability, this thickness will be that of two stacked sheets. Then, the average Mt is (2d+d+d)/3=4/3d and, at the step ⓐ, Dti≧4/3Mt=2d. Under this condition, the stacked feed of sheets indicated by the data Dti may also be overlooked at the step ⓐ. Nevertheless, at a step ⓑ, the result of computation Dti≧¾Dt(i-1)=3/2d is no and, at a step ⓒ, the latest data Dti is additionally compared with the data 3/2Dt(i-2) to safely find out the stacked feed of this time. Therefore, there can be detected a situation wherein Dti is 2d when Dt(i-1) is 2d. If Dti=d and Dt(i-1)=2d, the result of computation Dti≦¼Dt(i-1)=½d at a step ⓓ is "no" so that the preceding thickness Dt(i-1) is determined to prepresent a stacked feed.

Data in the case of an abnormal sheet thickness is not written in the random access memory 78 and discarded to be replaced by data under a normal condition.

Now, in the zero thickness measurement subflow which is the step ② onward, the gate signal $G_2$ is first turned on to turn on the switching element 86 for the time period Δt while resetting the capacitor 84. Then, the gate signal $G_2$ is turned off and the gate signal $G_1$ turned on to trigger the timer $t_1$. Upon the lapse of the time period $t_1$, the gate signal $G_1$ is turned off to read the integrated digital data Doi. This data Doi is compared with the product of the coefficient 3/2 and the average Mt stored in the random access memoryy 78. If the data Doi is larger than the product, a sheet is determined to be still lying between the rollers 54 and 56 so that a signal indicating a paper feed failure is produced and the operation returns to the main flow. If the data Doi is smaller than 3/2 Mt, of the results of the past three zero thickness measurements Do(i-1), Do(i-2) and Do(i-3), the oldest one Do(i-3) is erased and the measured value Doi of this time is stored instead while changing "i" to "i - 1". That is, the stored data are altered. The average Mo of the renewed data is computed and stored anew in the random access memory 78. Then, the Mo flag is made logical "1" whereupon the operation returns to the main flow.

In the embodiment described hereinabove, the non-volatile random access memory 78 constantly stores therein an average Mo (zero sheet thickness) of values provided by the past measurements and Mt (sheet thickness); the data are replaced by those with a new measured value introduced therein when the new measured value is determined normal. It will therefore be understood that, when the zero thickness measurement level is progressively shifted due to the wear of the rollers or the like, the average Mo in the random access memory 78 is shifted accordingly and automatically to ensure accurate measurement of sheet thickness.

When the sheet thickness undergoes a substantial change, the new sheet thickness data is not loaded in the random access memory 78 and, instead, a signal indicative of the stacked feed of this time is produced repeatedly. Where the change in sheet thickness is relatively small, the stacked feed is not detected and, instead, the data in the random access memory 78 are altered automatically; for this purpose, the coefficients at the steps ⓐ - ⓓ and the like are selected with some margins. However, to accurately check a failure for each sheet thickness, a resetting means may be employed such that, when it is closed, all the data Dt(i-1), Dt(i-2), Dt(i-3) and Mt in the random access memory 78 are cleared, or the failure output may be inhibited and/or the operation may jump the failure discrimination throughout three times of additional measurement.

In summary, it will be seen that the present invention provides an apparatus which can sense a thickness of a sheet under transfer substantially regardless of eccentricities of opposite rollers and thereby automatically detect a stacked feed of sheets, absence or unexpected staying of a sheet, and other failures. This eliminates the need for a highly accurate eccentricity control such as reducing the eccentricity of each roller peripheral surface to a fraction of a sheet thickness. Even though rollers may have usual eccentricities or even larger ones, the sheet thickness can be measured accurately and failures in sheet feed can be discriminated with accuracy.

Various modifications will become possible for those skilled in the art after receiving the teachings of the present disclosure without departing from the scope thereof. For example, the current data may be compared with only the data of the immediately preceding measurement instead of the average of the past multiple measurements. The non-volatile random access memory 78 used in the embodiment described may be omitted. In this case, an arrangement may be made such that, after the power source is turned on, the thickness is measured for the first sheet, then the zero thickness is measured, then these thicknesses are stored in a memory, then the thicknesses of the 2nd to the n-th sheets are compared with the result of the immediately preceding measurement to discriminate a failure, and then the thicknesses of the (n+1)-th sheet and onward are compared with an average of the "n" data. Again, a resetting means may be employed such that, when it is closed, all the stored data are cleared with or without the operation jumping the failure discrimination up to the m-th sheet.

What is claimed is:

1. An apparatus for discriminating a sheet transfer condition, comprising:
   a pair of feed rollers cooperatively disposed in a predetermined sheet feed path, at least one of the rollers being movable toward and away from the other, said movable roller being displaced from the other while a sheet is fed between the rollers by an amount which corresponds to a thickness Dti of the sheet;
   roller displacement sensing means for sensing a displacement of the movable roller from the other while a sheet is fed between the rollers; and
   computing means for computing a period of time for which at least one of the rollers completes an integral number of rotations, for computing the amount of a displacement of the movable roller for the computed period of time, and for processing the computed amount of displacement on a time series basis, whereby whether the amount of displacement of the movable roller indicative of the sheet thickness Dti coincides with a predetermined sheet thickness is determined.

2. An apparatus as claimed in claim 1, in which when the rollers have a common diameter the computed period of time is a period of time for which each of the rollers takes to complete an integral number of rotation and, when the rollers have different diameters, a time period for which a larger diameter roller takes to complete an integral number of rotation.

3. An apparatus as claimed in claim 2, in which when the rollers have different diameters, the computed period of time is a time period for which both the rollers complete integral numbers of rotations individually.

4. An apparatus as claimed in claim 1, in which the sheet thickness Dti corresponding to a displacement of the movable roller is computed by subtracting a time series processed value Do for a condition wherein a sheet is absent between the rollers from a time series processed value Di for a condition wherein a sheet is present between the rollers.

5. An apparatus as claimed in claim 1, in which a plurality of time series processed values Doi, where i=1, 2, 3, ... for the sheet absent condition are stored and, every time a new value Doi is computed, the oldest one of the stored values Doi is replaced by the new value Doi, the sheet thickness Dti being obtained by subtracting an average Mo of the updated plurality of time series processed values from the time series processed value Di.

6. An apparatus as claimed in claim 4, in which a plurality of time series processed values Doi, where i=1, 2, 3, ... for the sheet absent condition are stored and, every time a new value Doi is computed, the oldest one of the stored values Doi is replaced by the new value Doi, the sheet thickness Dti being obtained by subtracting a smoothed value of the updated plurality of time series processed values from the time series processed value Di.

7. An apparatus as claimed in claim 1, in which a sheet thickness Dti determined by the latest measurement is compared with a product of a thickness Dt(i-1) obtained in the immediately preceding measurement and a predetermined coefficient, thereby computing a relative thickness differential of the sheet.

8. An apparatus as claimed in claim 1, in which a plurality of time series processed values Dti, where i=1, 2, 3, ... are stored and the oldest one of the thicknesses is replaced by a new thickness Dti every time a new thickness is obtained, the latest measured thickness Dti being compared with a product of a predetermined coefficient and an average of the stored plurality of thicknesses which is obtained immediately before the latest measurement.

9. An apparatus as claimed in claim 1, in which a plurality of time series processed values Dti, where i=1, 2, 3, ... are stored and the oldest one of the thicknesses is replaced by a new thickness Dti every time a new thickness is obtained, the latest measured thickness Dti being compared with a product of a predetermined coefficient and a smoothed value of the stored plurality of thicknesses which is obtained immediately before the latest measurement.

10. An apparatus as claimed in claim 8, in which the renewal of the stored thickness is prevented when the latest thickness differential is larger than predetermined one.

11. An apparatus as claimed in claim 8, in which the thickness Dt(i-1) provided by the immediately preceding measurement is replaced by another measured thickness when the thickness Dt(i-1) differs from the latest measured thickness by an amount which is larger than predetermined one.

* * * * *